US012602069B2

(12) United States Patent
Bhuiyan et al.

(10) Patent No.: US 12,602,069 B2
(45) Date of Patent: Apr. 14, 2026

(54) SYSTEMS AND METHODS FOR DYNAMICALLY CHANGING REGULATOR VOLTAGE OF A SCANNING DEVICE HAVING AN ILLUMINATION SYSTEM AND AN IMAGER

(71) Applicant: ZEBRA TECHNOLOGIES CORPORATION, Lincolnshire, IL (US)

(72) Inventors: Mahmudul H. Bhuiyan, Centereach, NY (US); Gennaro Squillante, Centereach, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 695 days.

(21) Appl. No.: 17/955,424

(22) Filed: Sep. 28, 2022

(65) Prior Publication Data

US 2024/0103554 A1      Mar. 28, 2024

(51) Int. Cl.
*G05F 1/575*        (2006.01)
*G06F 1/3296*       (2019.01)

(52) U.S. Cl.
CPC ............ *G05F 1/575* (2013.01); *G06F 1/3296* (2013.01)

(58) Field of Classification Search
CPC ... G05F 1/575; G06F 1/3296; G06K 7/10207; G06K 7/10881
See application file for complete search history.

(56) References Cited

U.S. PATENT DOCUMENTS

| | | | | |
|---|---|---|---|---|
| 6,002,918 A * | 12/1999 | Heiman | ............. | G06K 17/0022 |
| | | | | 455/574 |
| 6,109,528 A * | 8/2000 | Kunert | .............. | G06K 7/10881 |
| | | | | 235/462.47 |
| 2003/0121981 A1* | 7/2003 | Slutsky | ............. | G06K 7/10851 |
| | | | | 235/462.45 |
| 2005/0045726 A1* | 3/2005 | Terlizzi | ............. | G06K 7/10881 |
| | | | | 235/454 |
| 2005/0174710 A1* | 8/2005 | Masui | .................... | G06F 1/266 |
| | | | | 361/92 |
| 2007/0215706 A1* | 9/2007 | Kotlarsky | .......... | G06K 7/10851 |
| | | | | 235/462.07 |
| 2009/0001163 A1* | 1/2009 | Barkan | ............. | G06K 7/10722 |
| | | | | 235/454 |
| 2009/0322277 A1* | 12/2009 | Cargin, Jr. | ............ | G06F 1/3228 |
| | | | | 320/106 |
| 2011/0080414 A1* | 4/2011 | Wang | ................... | G06K 7/1413 |
| | | | | 345/502 |

(Continued)

*Primary Examiner* — Nha T Nguyen
(74) *Attorney, Agent, or Firm* — Yuri Astvatsaturov

(57)        ABSTRACT

Systems and methods for dynamically changing regulator voltage of a scanning device having an illumination system and an imager to reduce current consumption during a suspend mode are disclosed herein. An example method includes detecting, by a microcontroller of the scanning device, an indication to initiate the suspend mode of the scanning device. The example method further includes adjusting, by the microcontroller executing a suspension routine, the voltage of a first voltage regulator of the scanning device from a first level to a second level, wherein the first voltage regulator provides power for use by (i) the microcontroller, (ii) the illumination system, and (iii) the imager, and the first level is less than the second level.

14 Claims, 8 Drawing Sheets

(56)                    References Cited

U.S. PATENT DOCUMENTS

| | | | | |
|---|---|---|---|---|
| 2011/0290889 A1* | 12/2011 | Tamburrini | ............ | G06K 7/109 |
| | | | | 235/472.01 |
| 2018/0293412 A1* | 10/2018 | Volta | ..................... | H02J 7/0044 |
| 2019/0228374 A1* | 7/2019 | Hicks | ................... | G06Q 20/204 |
| 2020/0225705 A1* | 7/2020 | Curti | ..................... | G06F 3/1423 |
| 2020/0243119 A1* | 7/2020 | Spica | .................. | G06F 11/0727 |
| 2020/0257351 A1* | 8/2020 | Stanzani | ............ | G06K 7/10881 |

* cited by examiner

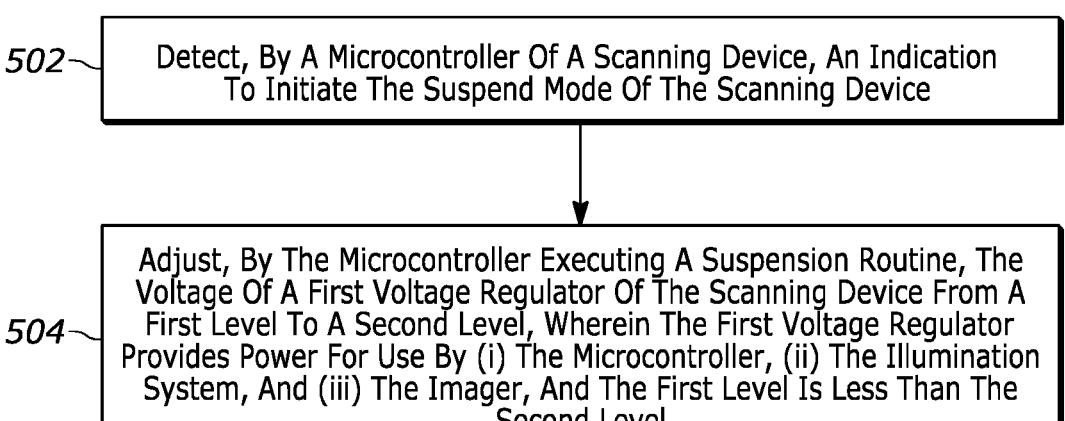

_500_

502 — Detect, By A Microcontroller Of A Scanning Device, An Indication To Initiate The Suspend Mode Of The Scanning Device 504 — Adjust, By The Microcontroller Executing A Suspension Routine, The Voltage Of A First Voltage Regulator Of The Scanning Device From A First Level To A Second Level, Wherein The First Voltage Regulator Provides Power For Use By (i) The Microcontroller, (ii) The Illumination System, And (iii) The Imager, And The First Level Is Less Than The Second Level

FIG. 5

SYSTEMS AND METHODS FOR DYNAMICALLY CHANGING REGULATOR VOLTAGE OF A SCANNING DEVICE HAVING AN ILLUMINATION SYSTEM AND AN IMAGER

BACKGROUND

Imaging devices, such as barcode readers, generally utilize voltage regulation to reduce incoming the voltage supply to appropriate levels for various components of the imaging devices. Many handheld versions of such imaging devices may enter a suspend mode during periods of low activity to reduce the demand on connected batteries. However, these imaging devices continue to incorporate an ever increasing number of features and components, and as a result, continue to increase the demand on the batteries. Conventional imaging devices suffer from an inability to adequately reduce the current draws of these features and components during a suspend mode, and thereby suffer from significantly reduced battery life.

Accordingly, there is a need for systems for dynamically changing regulator voltage of a scanning device having an illumination system and an image.

SUMMARY

In an embodiment, the present invention is a method for dynamically changing regulator voltage of a scanning device having an illumination system and an imager to reduce current consumption during a suspend mode. The method includes: detecting, by a microcontroller of the scanning device, an indication to initiate the suspend mode of the scanning device; and adjusting, by the microcontroller executing a suspension routine, the voltage of a first voltage regulator of the scanning device from a first level to a second level, wherein the first voltage regulator provides power for use by (i) the microcontroller, (ii) the illumination system, and (iii) the imager, and the first level is less than the second level.

In a variation of this embodiment, detecting the indication to initiate the suspend mode of the scanning device further comprises: receiving, from a host device, the indication to initiate the suspend mode of the scanning device; or determining, by the microcontroller, to initiate the suspend mode of the scanning device based on a bus activity level between the scanning device and the host device. Further in this variation, the microcontroller executing the suspension routine further comprises: adjusting, by the microcontroller, at least one of the illumination system or the imager from an active state to an inactive state; and adjusting, by the microcontroller, the voltage of the first voltage regulator from the first level to the second level. Still further in this variation, the microcontroller executing the suspension routine further comprises: receiving, from the host device, a new indication to deactivate the suspend mode of the scanning device; adjusting, by the microcontroller, the voltage of the first voltage regulator from the second level to the first level; and adjusting, by the microcontroller, the at least one of the illumination system or the imager from the inactive state to the active state. Yet further in this variation, the microcontroller executing the suspension routine further comprises: determining, by the microcontroller, that bus activity has occurred between the scanning device and the host device; adjusting, by the microcontroller, the voltage of the first voltage regulator from the second level to the first level; and adjusting, by the microcontroller, the at least one of the illumination system or the imager from the inactive state to the active state.

In another variation of this embodiment, a second voltage regulator is disposed between the first voltage regulator and the microcontroller; and the second voltage regulator provides power for use by the microcontroller at a third level that is less than the second level.

In yet another variation of this embodiment, the first voltage regulator provides power to at least one other peripheral; and the at least one other peripheral includes one of: (i) a radio, (ii) a near-field communication (NFC) tag, (iii) a capacitive touch button controller, (iv) an inductive touch button controller, (v) a light emitting diode (LED), or (vi) a wireless power transfer transmitter.

In still another variation of this embodiment, the first voltage regulator, the microcontroller, the illumination system, and the imager are part of a voltage regulation circuit that is configured to supply power to each component of the scanning device; and the first voltage regulator is a first voltage variable element in the voltage regulation circuit that receives electrical current from a power source that is electrically coupled to the voltage regulation circuit.

In yet another variation of this embodiment, the first voltage regulator is a fixed voltage regulator.

In another embodiment, the present invention is a computer system for dynamically changing regulator voltage of a scanning device having an illumination system and an imager to reduce current consumption during a suspend mode. The system includes: one or more processors; and a non-transitory computer-readable memory coupled to the one or more processors. The memory stores instructions thereon that, when executed by the one or more processors, cause the one or more processors to: detect an indication to initiate the suspend mode of the scanning device, and adjust, by executing a suspension routine, the voltage of a first voltage regulator of the scanning device from a first level to a second level, wherein the first voltage regulator provides power for use by (i) the microcontroller, (ii) the illumination system, and (iii) the imager, and the first level is less than the second level.

In a variation of this embodiment, the instructions, when executed by the one or more processors, further cause the one or more processors to detect the indication to initiate the suspend mode of the scanning device by: receiving, from a host device, the indication to initiate the suspend mode of the scanning device; or determining to initiate the suspend mode of the scanning device based on a bus activity level between the scanning device and the host device. Further in this variation, the instructions, when executed by the one or more processors, further cause the one or more processors to execute the suspension routine by: adjusting at least one of the illumination system or the imager from an active state to an inactive state; and adjusting the voltage of the first voltage regulator from the first level to the second level. Yet further in this variation, the instructions, when executed by the one or more processors, further cause the one or more processors to execute the suspension routine by: receiving, from the host device, a new indication to deactivate the suspend mode of the scanning device; adjusting the voltage of the first voltage regulator from the second level to the first level; and adjusting the at least one of the illumination system or the imager from the inactive state to the active state. Still further in this variation, the instructions, when executed by the one or more processors, further cause the one or more processors to execute the suspension routine by: determining that bus activity has occurred between the scanning device and the host device; adjusting the voltage of the first voltage regulator from the second level to the first level; and adjusting the at least one of the illumination system or the imager from the inactive state to the active state.

In another variation of this embodiment, a second voltage regulator is disposed between the first voltage regulator and the microcontroller; and the second voltage regulator provides power for use by the microcontroller at a third level that is less than the second level.

In yet another variation of this embodiment, the first voltage regulator provides power to at least one other peripheral; and the at least one other peripheral includes one of: (i) a radio, (ii) a near-field communication (NFC) tag, (iii) a capacitive touch button controller, (iv) an inductive touch button controller, (v) a light emitting diode (LED), or (vi) a wireless power transfer transmitter.

In still another variation of this embodiment, the first voltage regulator, the microcontroller, the illumination system, and the imager are part of a voltage regulation circuit that is configured to supply power to each component of the scanning device; and the first voltage regulator is a first voltage variable element in the voltage regulation circuit that receives electrical current from a power source that is electrically coupled to the voltage regulation circuit.

In yet another embodiment, the present invention is a tangible machine-readable medium comprising instructions for dynamically changing regulator voltage of a scanning device having an illumination system and an imager to reduce current consumption during a suspend mode. When executed, these instructions cause a machine to at least: detect an indication to initiate the suspend mode of the scanning device; and adjust, by executing a suspension routine, the voltage of a first voltage regulator of the scanning device from a first level to a second level, wherein the first voltage regulator provides power for use by (i) the microcontroller, (ii) the illumination system, and (iii) the imager, and the first level is less than the second level.

In a variation of this embodiment, the instructions, when executed, further cause the machine to detect the indication to initiate the suspend mode of the scanning device by: receiving, from a host device, the indication to initiate the suspend mode of the scanning device; or determining to initiate the suspend mode of the scanning device based on a bus activity level between the scanning device and the host device. Further in this variation, the instructions, when executed, further cause the machine to execute the suspension routine by: adjusting at least one of the illumination system or the imager from an active state to an inactive state; and adjusting the voltage of the first voltage regulator from the first level to the second level.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

4

Figure 1:
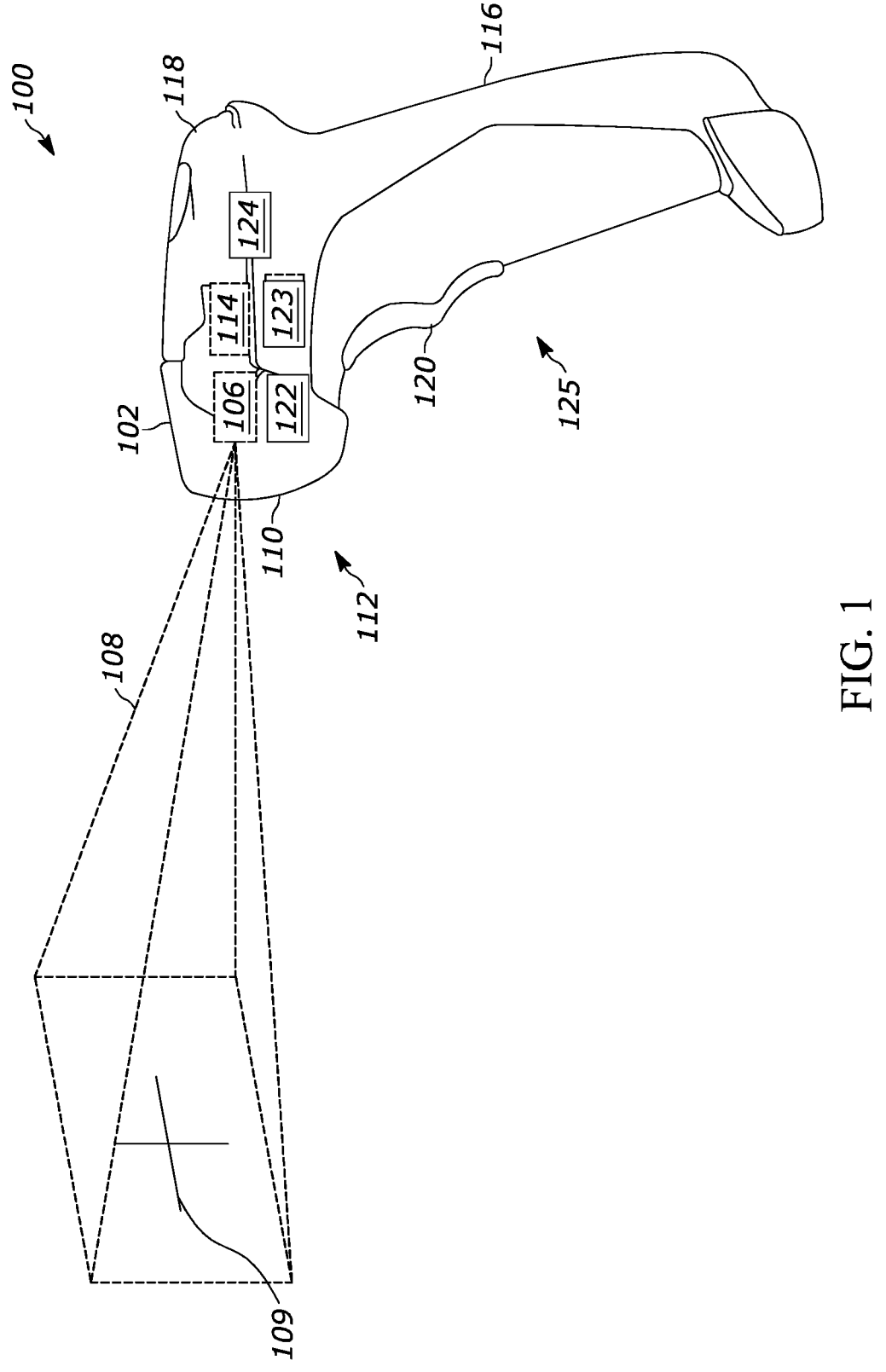
FIG. 1 is a perspective view of an example scanning device, in accordance with various embodiments of the present invention.
Figure 2:
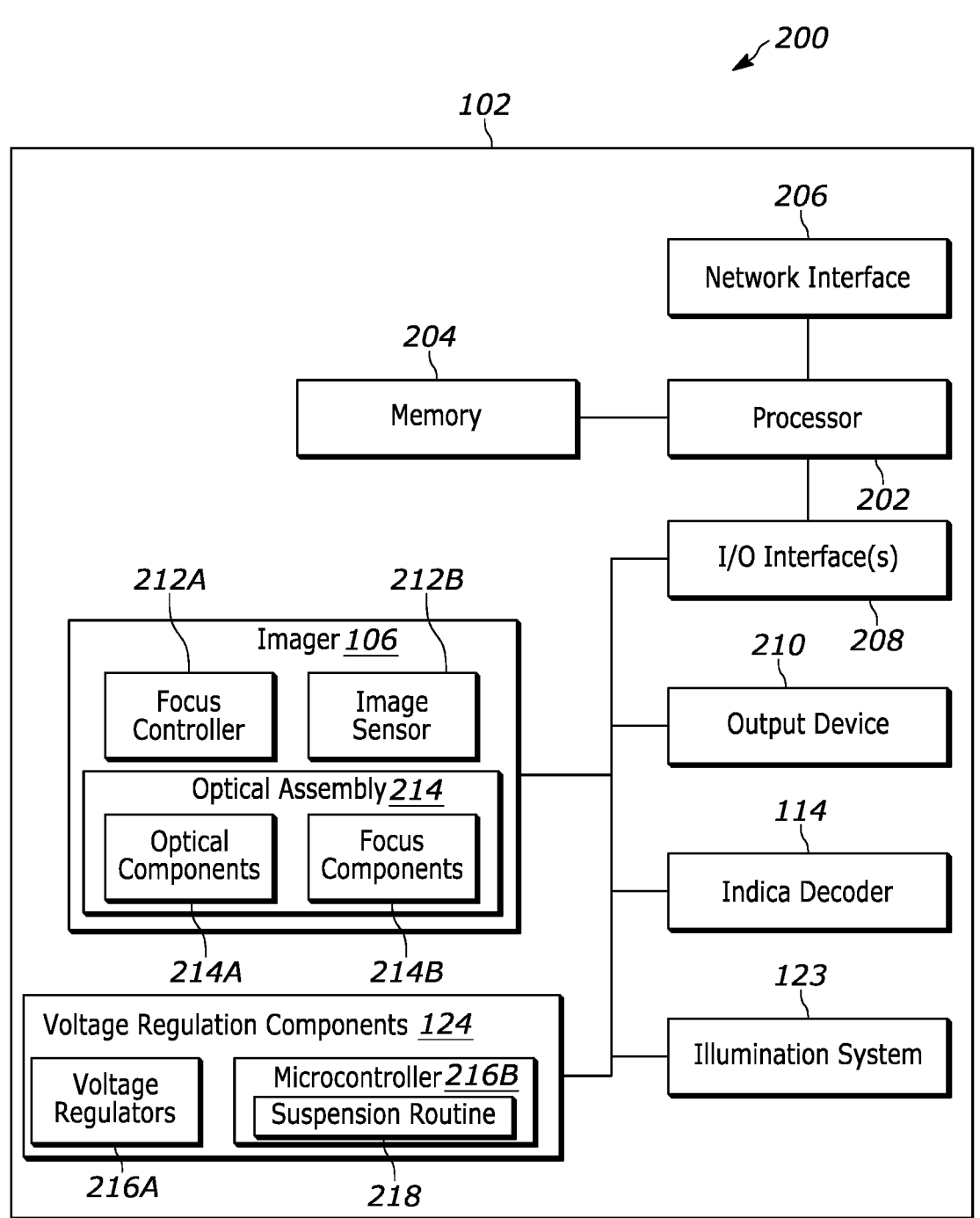

FIG. 2 is a block diagram representative of an example logic circuit for implementing the example scanning device of FIG. 1, in accordance with embodiments described herein.

Figure 3A:
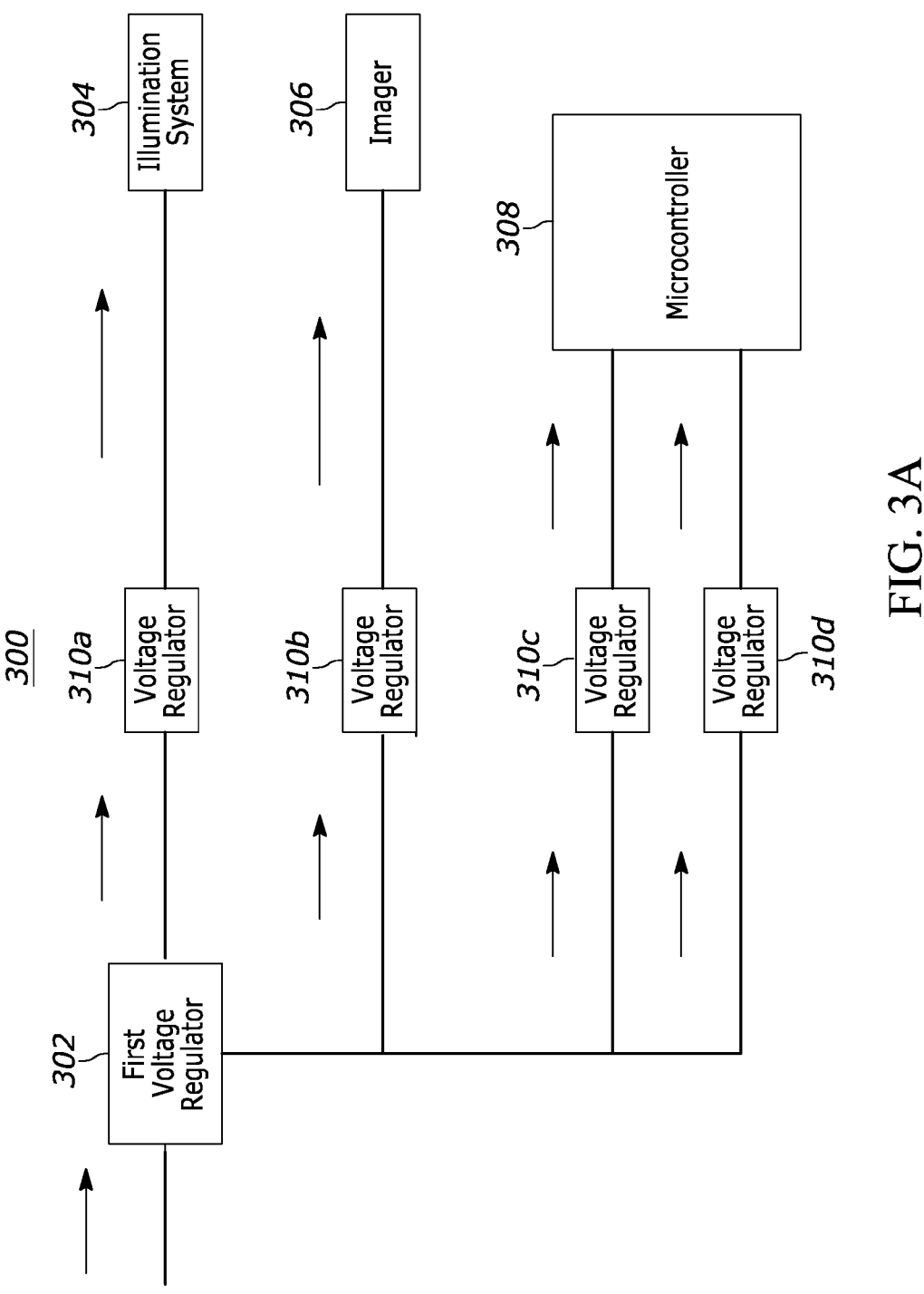
Figure 3B:
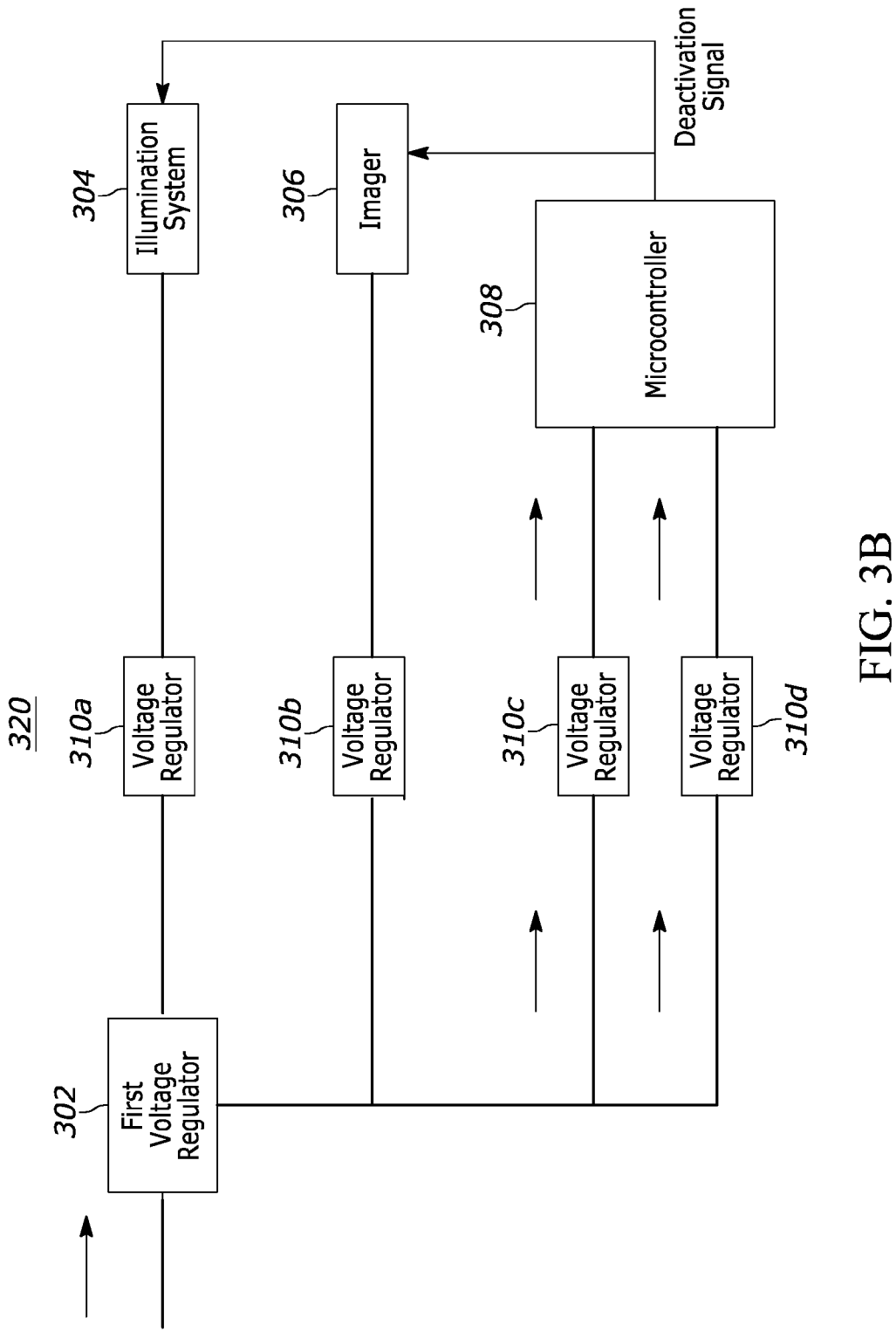
Figure 3C:
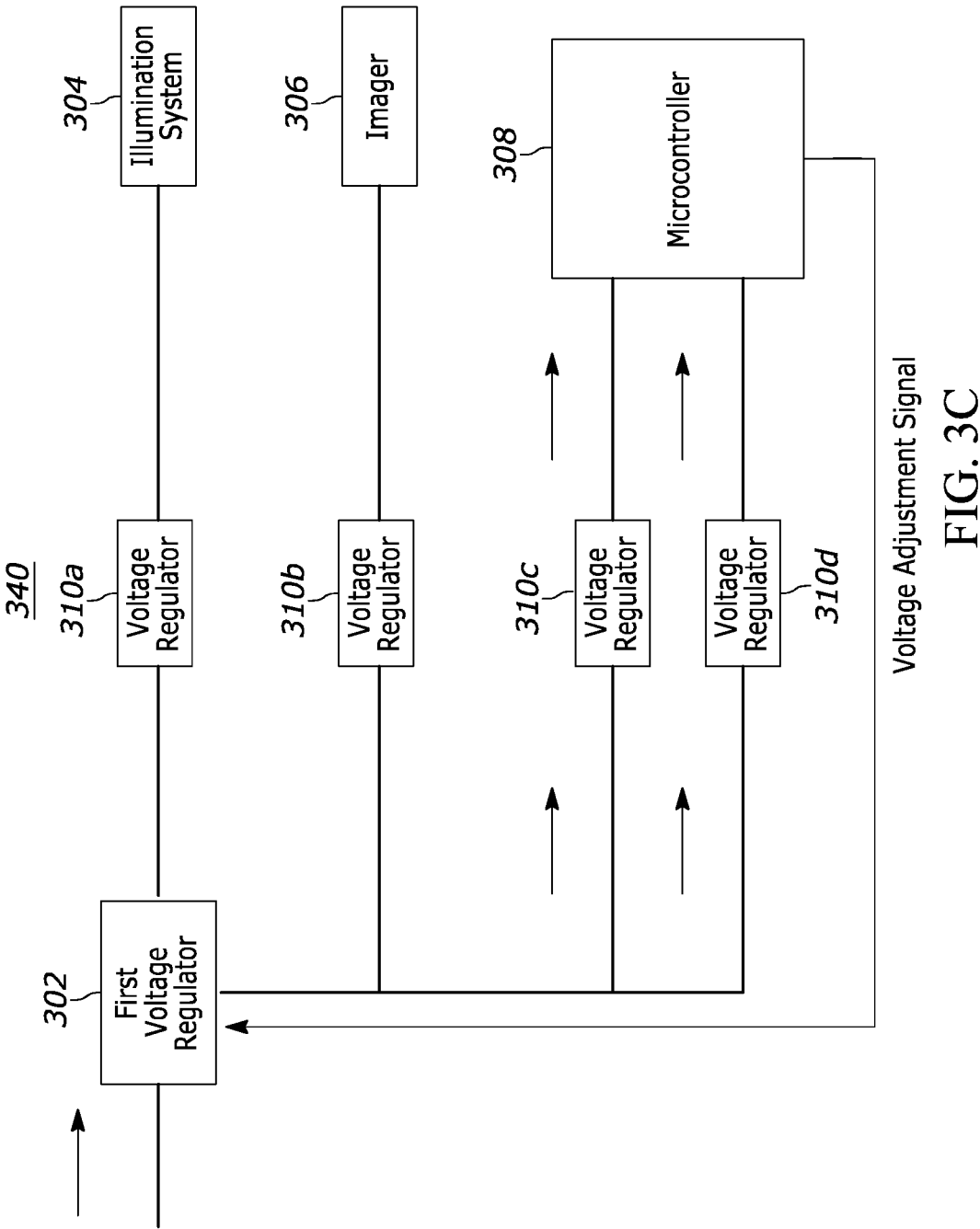

FIGS. 3A-3C illustrate an example voltage regulation circuit dynamically regulating the voltage supply to peripheral components of a scanning device when transitioning to a suspend mode, in accordance with various embodiments of the present invention.

Figure 4A:
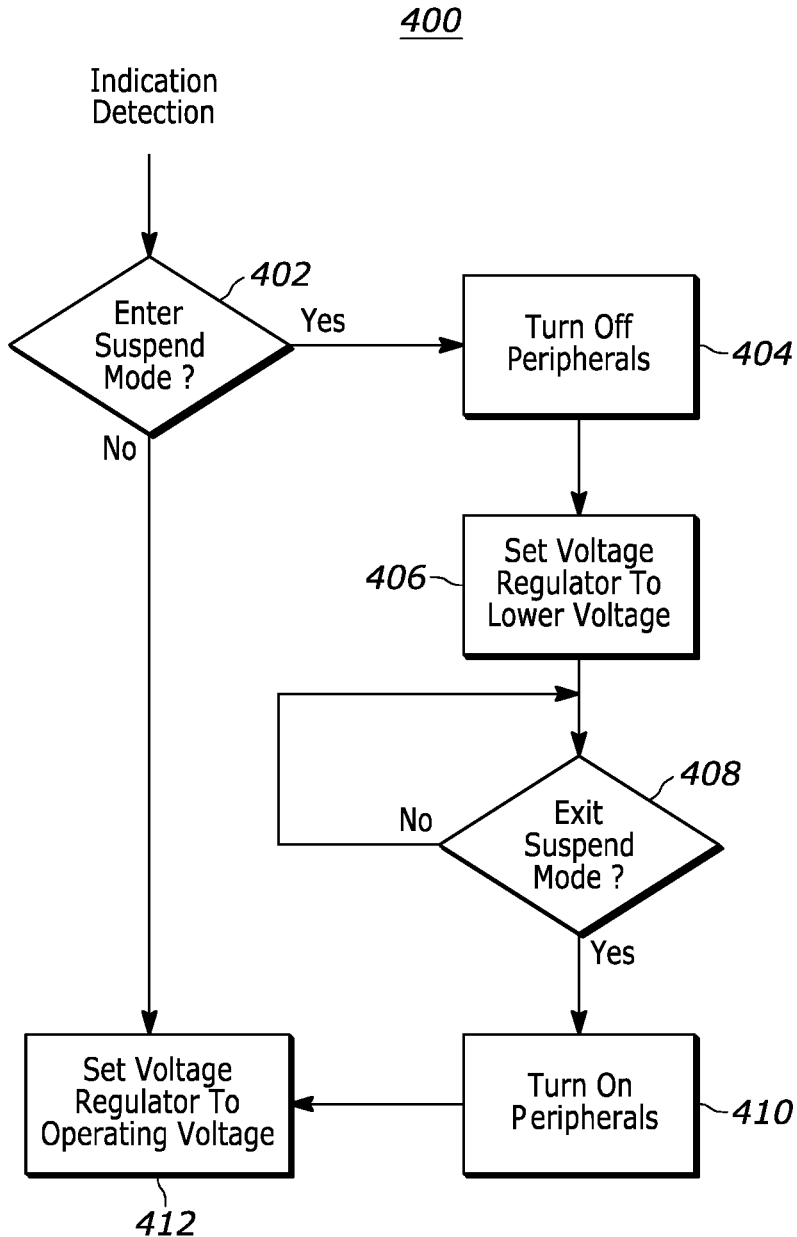

FIG. 4A is a block diagram illustrating an example method of dynamically regulating the voltage supply to peripheral components of a scanning device when transitioning to a suspend mode, in accordance with various embodiments of the present invention.

Figure 4B:
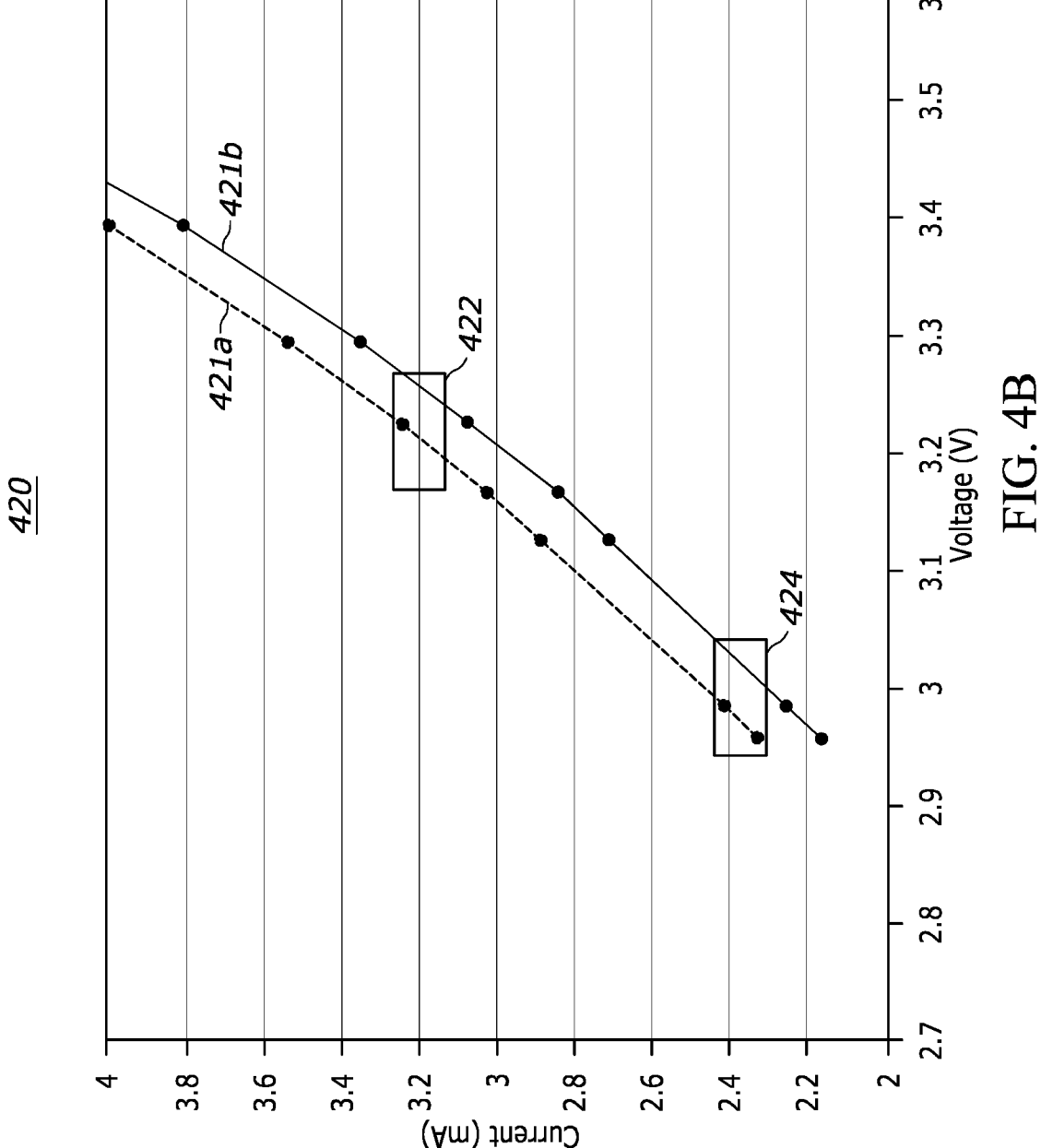

FIG. 4B is a graph illustrating the reduced current draws resulting from dynamically regulating the voltage supply to peripheral components of a scanning device when transitioning to a suspend mode, in accordance with various embodiments of the present invention.

FIG. 5 illustrates an example method for dynamically changing regulator voltage of a scanning device having an illumination system and an imager, in accordance with various embodiments of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Imaging device, such as a barcode scanner, users often desire to keep the imaging device powered on without actively using the device. Handheld imaging devices normally include a battery that powers the components of the imaging device during operation, and such batteries are generally capable of powering the imaging device for several hours before requiring recharging. Part of this battery life results from the imaging devices entering a suspend mode where the device draws less current from the battery to preserve battery life. An imaging device may enter this suspend mode after a certain period of time elapses, during which, the user has not used the imaging device. As referenced herein, an "imaging device" may also be referenced as a "scanning device", such that scanning devices may perform imaging functionality that includes scanning and other imaging functions.

However, as previously mentioned, contemporary imaging devices continue to incorporate an ever increasing number of features and components, and as a result, continue to increase the demand on the batteries. Conventional imaging devices suffer from an inability to adequately reduce the current draws of these features and components during a suspend mode, and thereby suffer from significantly reduced battery life. As a result, users of these conventional imaging devices are forced to frequently re-charge batteries for the imaging devices and/or otherwise diligently manage the battery life of the imaging device. Thus, users of such conventional imaging devices are presented with a compromise between increased imaging device downtime resulting from additional features and components or increased imaging device battery life with fewer features and components.

The systems/methods of the present disclosure provide solutions to this battery life problem associated with traditional imaging devices. Namely, the methods/systems of the present disclosure alleviate these battery life problems associated with traditional imaging devices by introducing a suspension routine that enables the systems described herein to adjust the voltage of a first voltage regulator of a scanning device from a first level to a second level. The first voltage regulator may provide voltage for use by (i) a microcontroller, (ii) an illumination system, and (iii) an imager, and the first level is may be less than the second level. The suspension routine may thereby enable the systems described herein to dynamically regulate the voltage supplied to components of an imaging device when entering a suspend mode or other low-power mode. In this manner, the systems and methods of the present disclosure enable an imaging device to independently regulate voltage (and by extension power) consumption by its components to extend the battery life of the imaging device when not in use.

Additionally, the systems and methods of the present disclosure can reduce the current draw of all components included in the imaging device. For example, by adjusting the voltage supplied by the voltage regulator, the suspension routine may also adjust the current draw of components receiving power from the voltage regulator. This reduced current draw may bring the total current draw of the imaging device in compliance with certain standards (e.g., Universal Serial Bus (USB) 3.0 suspend) that apply to the imaging device and/or components of the imaging device.

Accordingly, the systems/methods of the present disclosure maximize imaging device efficiency by enabling users to more efficiently use the battery life of the imaging devices, and by reducing the amount of imaging device downtime when users must wait for the batteries to complete charging. Further, the systems/methods of the present disclosure greatly improve the user experience by enabling users to utilize imaging devices without requiring additional equipment beyond the imaging device (e.g., additional batteries, charging stations, etc.).

Referring now to the drawings, FIG. 1 is a perspective view of an example imaging device 100, in accordance with various embodiments of the present invention. The example imaging device 100 includes an example housing 102 that includes a generally elongated handle or lower handgrip portion 116, and an upper body portion 118 having the front side 112 at which the front-facing opening or window 110 is located. The cross-sectional dimensions and overall size of the handgrip portion 116 are such that the example imaging device 100 can be conveniently held in an operator's hand during operation. The front-facing opening or window 110 is configured to face generally away from a user when the user has the example imaging device 100 in a handheld position. The portions 116 and 118 may be constructed of a lightweight, resilient, shock-resistant, self-supporting material, such as a synthetic plastic material. The housing 102 may be injection molded, but can also be vacuum-formed or blow-molded to form a thin hollow shell which bounds an interior space whose volume is sufficient to contain the various components of the handheld scanner 100. Although the housing 102 is illustrated as a portable, point-of-transaction, gun-shaped, handheld housing, any other configuration including a hands-free configuration could be used.

The example imaging device 100 also includes an imager 106 that is disposed within the example housing 102. The imager 106 captures image data representing a target in a field of view 108 at least partially defined by a front-facing opening or window 110 (also referenced herein as an "optical window") on a front side 112 of the example imaging device 100. The example imaging device 100 also includes an imaging shutter 122 configured to actuate and expose the imager 106 to an external environment, a portion of which is included in the FOV 108.

More specifically, the example imaging device 100 may also include a manually actuatable trigger 120 that is mounted in a moving relationship on the handgrip portion 116 in a forward facing region of the handgrip portion 116 that is configured to actuate the imaging shutter 122. An operator's finger can be used to actuate (e.g., depress) the trigger 120 once a target falls within the imaging field of view 108, thereby causing the imaging shutter 122 to actuate (e.g., open) and expose the imager 106 to capture an image of the target. As a result of actuating the trigger 120, the example imaging device 100 may generate an aiming pattern 109, which may visually indicate the field of view 108 of the example imaging device 100 for the operator utilizing the device 100, and may more specifically indicate a region within the field of view 108 where the device 100 may successfully scan and/or otherwise interpret an indicia within the field of view 108. In certain instances, the imager 106 may be configured to capture the image during an image capture period, during which, the imaging shutter 122 actuates and exposes the imager 106 to the external environment. The example imaging device 100 also includes an indicia decoder 114 in communication with the imager 106, and configured to receive image data comprising the image and decode an indicia represented in the image data.

The example imaging device 100 also includes an illumination 123 configured to emit illumination. Generally speaking, the illumination system 123 may be configured to output illumination in response to receiving a forward voltage from a battery (not shown) as a result of the operator actuating the trigger 120. The illumination system 123 may be or include a light emitting diode (LED) that may be configured to output illumination in a variety of wavelengths or patterns. For example, the illumination system 123 may generate the aiming pattern 109. Regardless, the illumination system 123 may be and/or include a single LED, multiple LEDs configured in series, multiple LEDs configured in parallel, multiple LEDs configured in series/parallel, and/or any other suitable number and/or configuration of LEDs or illumination sources or combinations thereof.

Further, the example imaging device 100 includes voltage regulation components 124 that are configured to regulate voltage supplied to components of the imaging device 100. Namely, the voltage regulation components 124 may include multiple voltage regulators and a microcontroller that is configured to, inter alio, adjust the voltage supplied by the voltage regulators. Using the voltage regulation components 124, the imaging device 100 may preserve and extend the battery life of the imaging device 100. Additionally, the voltage regulation components 124 may bring the imaging device 100 into compliance with various standards (e.g., USB 3.0 suspend) regarding current draws during standard modes (e.g., suspend mode).

FIG. 2 is a block diagram representative of an example logic circuit capable of implementing, for example, the example imaging device 100 of FIG. 1. The example logic circuit of FIG. 2 is a processing platform 200 capable of executing instructions to, for example, implement operations of the example methods described herein, as may be represented by the flowcharts of the drawings that accompany this description. Other example logic circuits capable of, for example, implementing operations of the example methods described herein include field programmable gate arrays (FPGAs) and application specific integrated circuits (ASICs).

The example processing platform 200 of FIG. 2 includes a processor 202 such as, for example, one or more microprocessors, controllers, and/or any suitable type of processor. The example processing platform 200 of FIG. 2 includes memory (e.g., volatile memory, non-volatile memory) 204 accessible by the processor 202 (e.g., via a memory controller). The example processor 202 interacts with the memory 204 to obtain, for example, machine-readable instructions stored in the memory 204 corresponding to, for example, the operations represented by the flowchart(s) of this disclosure. Additionally, or alternatively, machine-readable instructions corresponding to the example operations described herein may be stored on one or more removable media (e.g., a compact disc (CD), a digital versatile disc (DVD), removable flash memory, etc.) that may be coupled to the processing platform 200 to provide access to the machine-readable instructions stored thereon. The processor 202 and the memory 204 are disposed in the housing 102.

The example processing platform 200 of FIG. 2 includes one or more communication interfaces such as, for example, one or more network interfaces 206, and/or one or more input/output (I/O) interfaces 208 disposed in the housing 102. The communication interface(s) may enable the processing platform 200 of FIG. 2 to communicate with, for example, another device, system, host system (e.g., an inventory management system, a POS station, etc.), datastore, database, and/or any other machine.

The example processing platform 200 of FIG. 2 may include the network interface(s) 206 to enable communication with other machines (e.g., an inventory management system, a POS station, etc.) via, for example, one or more networks. The example network interface(s) 206 include any suitable type of communication interface(s) (e.g., wired and/or wireless interfaces) configured to operate in accordance with any suitable communication protocol(s). Example network interfaces 206 include a TCP/IP interface, a Wi-Fi™ transceiver (e.g., according to the IEEE 802.11x family of standards), an Ethernet transceiver, a cellular network radio, a satellite network radio, or any other suitable interface based on any other suitable communication protocols or standards.

The example, processing platform 200 of FIG. 2 may include the input/output (I/O) interface(s) 208 (e.g., a Bluetooth® interface, a near-field communication (NFC) interface, a universal serial bus (USB) interface, a serial interface, an infrared interface, etc.) to (1) enable receipt of user input (e.g., from the trigger 120 of FIG. 1, a touch screen, keyboard, mouse, touch pad, joystick, trackball, microphone, button, etc.), (2) communicate output data (e.g., mode change confirmations, visual indicators, instructions, data, images, etc.) to the user (e.g., via an output device 210, speaker, printer, haptic device, etc.), and/or (3) interact with other components of the handheld scanner 200 (e.g., the imager 106, the output device 210, the indicia decoder 114, the illumination system 123, the voltage regulation components 124, etc.). Example output devices 210 may include a sound generation device, a haptic device, or the like.

To capture images of objects and/or barcodes on objects, the example processing platform 200 includes the imager 106 disposed in the housing. The imager 106 includes an image sensor 212B under control of, for example, the processor 202 to capture image frames representative of the portion of an environment in which the example imaging device 100 is operating that falls within the imaging field of view 108 of the imager 106. The image sensor 212B includes a plurality of photosensitive elements forming a substantially flat surface. The processor 202 may be communicatively coupled to the imager 106 via the input/output (I/O) interface(s) 208.

The imager 106 includes an optical assembly 214 to form images of objects in the field of view 108 on the surface of the image sensor 212B. The optical assembly 214 may include any number and/or type(s) of optical elements and/or components 214A including, for example, one or more lenses, filters, focus motors, apertures, lens holder, liquid lenses, or any other components and/or optical elements. Moreover, to focus the imager 106 on an object, the imager 106 may include a focus controller 212A, and the optical assembly 214 may include any number and/or type(s) of focus components 214B (e.g., motors, liquid lenses, etc.). In some examples, the focus controller 212A is implemented by the processor 202. In some examples, the imager 106 is a fixed-focus scanner.

The example processing platform 200 also includes any number and/or type(s) indicia decoders 114 (e.g., the indicia decoder 114) to detect and/or decode indicia to determine the payload of the indicia. In some examples, the indicia decoder 114 is implemented by the processor 202. The indicia decoder 114, e.g., via the processor 202, conveys the payload of decoded indicia to a host system via a communication interface such as the network interface(s) 206 and/or the I/O interface(s) 208. Further, to illuminate a target to be imaged, the example processing platform 200 may also include the illumination system 123. The illumination system 123 may emit illumination in the field of view 108 to, for example, facilitate autofocusing and/or improve the quality of image frames captured by the image sensor 106.

The example processing platform 200 may also include voltage regulation components 124 that are configured to regulate a driving voltage to the various components of the example processing platform 200. More specifically, the voltage regulation components 124 may include voltage regulators 216A and a microcontroller 216B. The microcontroller 216B may store instructions comprising at least a suspension routine 218 that, when executed, may generally cause the microcontroller 218 to adjust the voltage supplied by at least one of the voltage regulators 216A and thereby decrease the current draw of components of the example processing platform 200. The suspension routine 218 may broadly ensure that the voltage supplied and the current drawn by the components of the example processing platform 200 (e.g., the imaging device 100) are sufficiently low that the battery life of the device 100 is maximally extended, while maintaining device 100 functionality. For example, the voltage regulation components 200 may regulate the voltage regulators 216A to decrease the current draw of any of the imager 106, the output device 210, the indicia decoder 114, the illumination system 123, the processor 202, the memory 204, the I/O interface(s) 208, the network interface 206, and/or any other components of the example processing platform 200 or combinations thereof.

FIGS. 3A-3C illustrate an example voltage regulation circuit 300, 320, and 340 dynamically regulating the voltage supply to peripheral components of a scanning device when transitioning to a suspend mode, in accordance with various embodiments of the present invention. In particular, FIG. 3A represents the example voltage regulation circuit 300 during a normal operating mode, such that all components of the circuit 300 receive power through a first voltage regulator 302. FIG. 3B represents the example voltage regulation circuit 320 during a first stage of transitioning to a suspend mode, such that some components of the circuit 320 no longer receive power through the first voltage regulator 302. FIG. 3C represents the example voltage regulation circuit 340 during a second stage of transitioning to the suspend mode, such that the voltage supplied by the first voltage regulator 302 is adjusted in accordance with a voltage adjustment signal.

Turning to FIG. 3A, the example voltage regulation circuit 300 is generally configured to drive various components of an imaging device (e.g., imaging device 100). The example voltage regulation circuit 300 may supply voltage/current output through a first voltage regulator 302 to drive an illumination system 304, an imager 306 (the illumination system 304 and the imager 306 referenced collectively herein as "peripheral components"), and a microcontroller 308. The example voltage regulation circuit 300 may also include additional voltage regulators 310a, 310b, 310c, and 310d disposed between each of the peripheral components 304, 306 and the microcontroller 308 that regulate the voltage to levels that are appropriate for each individual component 304, 306, and 308.

As illustrated in FIG. 3, the example voltage regulation circuit 300 may include the first voltage regulator 302 which may supply voltage to components of the circuit 300. The first voltage regulator 302 may generally receive an input voltage directly from a power supply (e.g., a battery) (now shown), and the first voltage regulator 302 may regulate this input voltage to an appropriate level to drive the connected components 304, 306, and 308 without providing excess power. More specifically, the first voltage regulator 302 may receive an input voltage of approximately 5 volts (V) directly from the power supply and may regulate this input voltage to supply approximately 3.3 V of voltage to the example voltage regulation circuit 300 components 304, 306, and 308 during normal operation. In this context, normal operation may generally refer to the example voltage regulation circuit 300 providing a driving electrical current to each of the components 304, 306, and 308 while the imaging device (e.g., imaging device 100) is being operated by a user to scan and/or otherwise image objects. During such normal operation, 3.3 V is generally sufficient to drive each of the illumination system 304, the imager 306, and the microcontroller 308, and this driving is illustrated in FIG. 3A by the arrows pointing toward the respective components 304, 306, and 308 along the electrical supply lines from the first voltage regulator 302.

However, each of the components 304, 306, and 308 may generally require different levels of input voltage for operation. For example, the illumination system 304 may be able to accept up to approximately 2.5 V of input voltage for normal operation, the imager 306 may be able to accept up to 2.8 V of input voltage for normal operation, and the microcontroller 308 may be able to accept up to 1.8 V on a first pin and 1.1 V on a second input pin for normal operation. In order to limit the input voltage for each individual component 304, 306, and 308, the voltage regulators 310a, 310b, 310c, and 310d may be disposed between the illumination system 304, the image 306, and the microcontroller 308 and the first voltage regulator 302 to regulate the input voltage for each individual component 304, 306, and 308. Accordingly, the voltage regulator 310a may regulate the input voltage to the illumination system 304 to approximately 2.5 V, the voltage regulator 310b may regulate the input voltage to the imager 306 to approximately 2.8 V, the voltage regulator 310c may regulate the input voltage to the first pin of the microcontroller 308 to approximately 1.8 V, and the voltage regulator 310d may regulate the input voltage to the second pin of the microcontroller 308 to approximately 1.1 V.

It should be understood that the voltage levels and current values provided herein are for the purposes of discussion only. Further, the example voltage regulation circuit 300 may generally also include other electronic component(s) that are electrically coupled to the example voltage regulation circuit 300. For example, the example voltage regulation circuit 300 may include additional illumination LEDs, one or more voltage sources, additional current paths, a radio, a near-field communication (NFC) tag, a capacitive touch button controller, an inductive touch button controller, a wireless power transfer transmitter, and/or any other suitable electronic component or combinations thereof. Additionally, the example voltage regulation circuit 300 may also be electrically coupled to a ground (not shown), such that the example voltage regulation circuit 300 receives input drive voltage from an input voltage source (not shown) which is discharged to the ground regardless of whether the current flows to each component of the example voltage regulation circuit 300.

FIG. 3B represents the example voltage regulation circuit 320 during a first stage of transitioning to a suspend mode, such that some components of the circuit 320 no longer receive power through the first voltage regulator 302. The first stage of transitioning to the suspend mode may generally involve the imaging device (e.g., imaging device 100) including the example voltage regulation circuit 320 being inactive for a period of time, such that the microcontroller 308 transmits a deactivation signal as part of a suspension routine (e.g., suspension routine 218) causing the illumination system 304 and the imager 306 to turn off and/or otherwise become inactive. In particular, the microcontroller 308 may transmit a deactivation signal to each of the illumination system 304 and the imager 306 to cause both peripheral components 304, 306 to deactivate. As a result of this deactivation signal transmitted by the microcontroller 308, the illumination system 304 and the imager 306 cease to draw current from the first voltage regulator 302. This is illustrated in FIG. 3B by the lack of arrows along the electrical supply lines leading to the illumination system 304 and the imager 306 from the first voltage regulator 302.

In the first stage represented by the example voltage regulation circuit 320, the microcontroller 308 may be the only electrical component drawing current from the first voltage regulator 302. In particular, each of the first pin and the second pin of the microcontroller 308 may continue to draw current from the first voltage regulator 302 through the voltage regulators 310c and 310d. This decreased current draw from the first voltage regulator 302 relative to the example voltage regulation circuit 300 may cause the current draw across the first voltage regulator to drop substantially. For example, the current draw across the first voltage regulator 302 in the example voltage regulation circuit 300 may be approximately 100-400 milliamps (mA), and the current draw across the first voltage regulator 302 in the example voltage regulation circuit 320 may be approximately 3.0 mA. However, such a current draw can significantly impact the battery life of the imaging device 100, and may violate standards associated with components included in the imaging device (e.g., USB 3.0 suspend).

To overcome these issues, the microcontroller 308 may execute a suspension routine (e.g., suspension routine 218) to lower the current draw even further. The suspension routine 218 may include instructions configured to modify/ adjust the voltage supplied by the first voltage regulator 302 to levels that may lower the current draw by the microcontroller 308. In particular, FIG. 3C represents the example voltage regulation circuit 340 during a second stage of transitioning to the suspend mode, such that the voltage supplied by the first voltage regulator 302 is adjusted in accordance with a voltage adjustment signal.

As illustrated in FIG. 3C, the microcontroller 308 may transmit the voltage adjustment signal to the first voltage regulator 302 that causes the regulator 302 to adjusts the voltage supplied from a first level to a second level that is less than the first level. More specifically, the voltage adjustment signal may turn a field-effect transistor (FET) and a resistor by a feedback signal input (FB) pin of the first voltage regulator 302 to bring the voltage from the first level to the second level. For example, the suspension signal may cause the first voltage regulator 302 to adjust the voltage supplied from 3.3 V to 3.0 V. In this example, the first level may be 3.3 V and the second level may be 3.0 V.

This drop in voltage may be acceptable because the only connected component (microcontroller 308) drawing current from the voltage regulator may only be able to draw current at up to 1.8 V. The peripheral components 304, 306 are inactive, such that there is no need to continue supplying 3.3 V through the first voltage regulator 302. Thus, the example voltage regulation circuit 340 has additional voltage headroom to reduce the voltage supplied by the first voltage regulator 302.

Reducing the supplied voltage from the first voltage regulator 302 indirectly reduces the current draw of the example voltage regulation circuit 340 (e.g., the microcontroller 308). To illustrate, the current draw across the first voltage regulator 302 in the example voltage regulation circuit 320 may be approximately 3.0 mA, and as a result of the voltage adjustment signal reducing the voltage supplied by the first voltage regulator 302, the current draw across the first voltage regulator 302 in the example voltage regulation circuit 340 may be approximately 2.0 mA.

The instructions comprising the suspension routine 218 may thus enable a user to more efficiently utilize an imaging device (e.g., imaging device 100) in circumstances where constant illumination (e.g., from the illumination system 304) or imaging functionality (e.g., from the imager 306) is not necessary, such as meeting a USB suspend, thereby preserving battery life by minimizing the overall current draw on the battery, etc.

Turning now to FIG. 4A, illustrated is an example block diagram 400 for dynamically regulating the voltage supply to peripheral components of a scanning device when transitioning to a suspend mode, in accordance with various embodiments of the present invention. The example block diagram 400 may be performed by a processor of an imaging device (such as the processor 202, microcontroller 308, and/or another similarly configured logic circuit).

At block 402, the example block diagram 400 includes receiving an indication detection and determining whether or not to enter a suspend mode. Generally speaking, the indication detection may represent an indication that an activity level of the imaging device has fallen below a threshold amount, such that the imaging device should enter a suspend mode to preserve battery life. For example, the indication detection may correspond to a bus activity level between the imaging device and a host device (e.g., desktop computer, workstation, etc.) to which the imaging device is attached. When the bus activity level between the imaging device and the host device ceases for longer than predetermined time and/or falls below a predetermined rate, the microcontroller may determine to initiate the suspension routine to enter suspend mode ("Yes" branch of block 402). However, if the microcontroller determines that the indication detection does not indicate that the imaging device should enter suspend mode, the example block diagram 400 may include proceeding to block 412 ("No" branch of block 402).

In any event, when the microcontroller determines that the imaging device should enter suspend mode, the example block diagram 400 may include proceeding to block 404. At block 404, the microcontroller may begin executing instructions comprising the suspension routine (e.g., suspension routine 218) by turning off and/or otherwise deactivating peripheral components (e.g., peripheral components 304, 306) of the imaging device, such that the peripheral components enter an inactive state. As previously discussed in reference to FIG. 3B, the microcontroller may instruct the peripheral components 304, 306 to deactivate thorough transmission of a deactivation signal. Upon receipt of the deactivation signal, the peripheral components 304, 306 may deactivate and thus cease to draw current across the voltage regulator (e.g., first voltage regulator 302).

At block 406, the microcontroller may proceed to execute further instructions of the suspension routine by setting the voltage of the voltage regulator (e.g., first voltage regulator 302) to a lower voltage. The lower voltage may be chosen based on the known voltage and current draw requirements of the microcontroller, such that the additional voltage headroom of the voltage regulator is reduced to accordingly reduce the current draw of the microcontroller and/or other remaining components of the voltage regulation circuit. For example, the original voltage of the voltage regulator (prior to execution of instructions comprising the suspension routine) may be approximately 3.3 V, and the lower voltage may be approximately 3.0 V or lower.

After reducing the voltage of the voltage regulator, the microcontroller may iteratively determine whether or not to exit suspend mode (block 408). Namely, the microcontroller may iteratively check for activity across a bus between the imaging device and a host device and/or any other signal indicating that the peripherals of the imaging device should be re-activated. If such activity and/or such a signal is detected ("Yes" branch of block 408), the microcontroller may proceed to turn the peripheral components back on (block 410). However, if the microcontroller checks for such activity and/or such a signal without determining any such activity or signal has been received ("No" branch of block 408), then the microcontroller may proceed to maintain suspend mode until a subsequent check. Of course, the microcontroller may iteratively check for bus activity or an activation signal at any suitable frequency (e.g., 1 millisecond (ms), 5 ms, 10 ms, etc.).

As mentioned, if the microcontroller detects bus activity and/or receives an activation signal, the microcontroller may proceed to activate the peripheral components (block 410). The microcontroller may execute instructions of the suspend routine that cause the microcontroller to generate and transmit an activation signal to the peripheral components. The activation signal may cause the peripheral components to activate, and thus begin drawing current across the voltage regulator. In certain embodiments, the suspension routine may cause the microcontroller to generate an activation signal that only activates a portion of the peripheral components. For example, the microcontroller may generate and transmit an activation signal to an imager (e.g., imager 306) to activate the imager, but the microcontroller may not generate or transmit an activation signal to an illumination system (e.g., illumination system 304). Regardless, with this increased current draw from the peripheral components, the suspension routine may also include instructions that cause the microcontroller to generate and transmit another signal to the voltage regulator that increases the voltage supplied by the voltage regulator. More specifically, at block 412, the suspension routine may include instructions that cause the microcontroller to generate and transmit another voltage adjustment signal to the voltage regulator. The voltage adjustment signal at block 412 may adjust the voltage of the voltage regulator from the lower level resulting from the actions of block 406 to a higher level based on the peripheral components re-activated as a result of the actions of block 410. For example, the activation signal generated and transmitted at block 410 may cause an illumination system (e.g., illumination system 304) and an imager (e.g., imager 306) to re-activate (e.g., switched into an active state), such that the voltage adjustment signal at block 412 may increase the voltage of the voltage regulator from 3.0 V (lower level) to 3.3 V (higher level).

To provide a better understanding of the impact resulting from the suspension routine of the present disclosure, FIG. 4B is a graph 420 illustrating the reduced current draws as a result of dynamically regulating the voltage supply to peripheral components of a scanning device when transitioning to a suspend mode, in accordance with various embodiments of the present invention. The graph 420 generally illustrates the current draw (y-axis) plotted against the voltage supply (x-axis) for components of an imaging device (e.g., components included in voltage regulation circuits 300, 320, and 340). The graph 420 may also include multiple plot lines 421a, 421b that may correspond, for example, to current draws at various voltages for different components, such as active and passive components of the imaging device (e.g., as part of a voltage regulation circuit).

At a first region 422, the plot 420 illustrates the current draw for components of an imaging device when the voltage of a voltage regulator is at a typical level, and the peripheral components are deactivated as a result of a deactivation signal generated and transmitted by the microcontroller executing instructions of a suspension routine (e.g., suspension routine 218). For example, the first region 422 shows that at approximately 3.2 V to 3.3 V, the current draw across a voltage regulator may be approximately 3.1 mA to 3.25 mA. Thus, the first region 422 may represent and/or otherwise correspond to the scenario illustrated in the example voltage regulator circuit 320 of FIG. 3B, where the microcontroller has generated and transmitted a deactivation signal to the peripheral components (e.g., peripheral components 304, 306) to eliminate the current draw of the peripheral components across the voltage regulator.

At the second region 424, the plot 420 illustrates the current draw of components of an imaging device when the voltage of a voltage regulator is reduced as a result of a voltage adjustment signal generated and transmitted by the microcontroller executing instructions of a suspension routine (e.g., suspension routine 218). As illustrated, the voltage of the voltage regulator in this second region 424 may be reduced from a typical level (3.2 V to 3.3 V in the first region 422) to a lower level (2.9 V to 3.0 V). When the voltage supplied by the voltage regulator is reduced from the typical level to the lower level, the current draw across the voltage regulator also reduces from approximately 3.1 mA to 3.25 mA in the first region 422 to approximately 2.2 mA to 2.4 mA in the second region 424. Thus, the second region 424 may represent and/or otherwise correspond to the scenario illustrated in the example voltage regulator circuit 340 of FIG. 3C, where the microcontroller has generated and transmitted a voltage adjustment signal to the voltage regulator (e.g., first voltage regulator 302) to reduce the voltage supplied by the voltage regulator.

FIG. 5 illustrates an example method 500 for dynamically changing regulator voltage of a scanning device having an illumination system and an imager, in accordance with various embodiments of the present invention. It should be understood that, in certain embodiments, any of the blocks of the method 500 may be performed by any of the example imaging device 100, the microcontroller 216B, 308, the processor(s) 202, and/or any other suitable device or combinations thereof.

The method 500 includes detecting, by a microcontroller of the scanning device, an indication to initiate the suspend mode of the scanning device (block 502). The method 500 further includes adjusting, by the microcontroller executing a suspension routine, the voltage of a first voltage regulator of the scanning device from a first level to a second level, wherein the first voltage regulator provides power for use by (i) the microcontroller, (ii) the illumination system, and (iii) the imager, and the first level is less than the second level (block 504). In certain embodiments, the method 500 may further include detecting the indication to initiate the suspend mode of the scanning device by: receiving, from a host device, the indication to initiate the suspend mode of the scanning device; or determining, by the microcontroller, to initiate the suspend mode of the scanning device based on a bus activity level between the scanning device and the host device. Further in these embodiments, the microcontroller executing the suspension routine may further include: adjusting, by the microcontroller, at least one of the illumination system or the imager from an active state to an inactive state; and adjusting, by the microcontroller, the voltage of the first voltage regulator from the first level to the second level.

Still further in these embodiments, the microcontroller executing the suspension routine may further include: receiving, from the host device, a new indication to deactivate the suspend mode of the scanning device; adjusting, by the microcontroller, the voltage of the first voltage regulator from the second level to the first level; and adjusting, by the microcontroller, the at least one of the illumination system or the imager from the inactive state to the active state. Yet further in these embodiments, the microcontroller executing the suspension routine may further include: determining, by the microcontroller, that bus activity has occurred between the scanning device and the host device; adjusting, by the microcontroller, the voltage of the first voltage regulator from the second level to the first level; and adjusting, by the microcontroller, the at least one of the illumination system or the imager from the inactive state to the active state.

In some embodiments, a second voltage regulator (e.g., voltage regulator 310c, 310d) may be disposed between the first voltage regulator (e.g., first voltage regulator 302) and the microcontroller (e.g., microcontroller 308). In these embodiments, the second voltage regulator may provide voltage for use by the microcontroller at a third level that is less than the second level. For example, the second level may be approximately 3.0 V, and the third level may be approximately 1.8 V or 1.1 V.

In certain embodiments, the first voltage regulator may provide voltage to at least one other peripheral. In these embodiments, the at least one other peripheral may include one of: (i) a radio, (ii) a near-field communication (NFC) tag, (iii) a capacitive touch button controller, (iv) an inductive touch button controller, (v) a light emitting diode (LED), or (vi) a wireless power transfer transmitter.

In some embodiments, the first voltage regulator, the microcontroller, the illumination system, and the imager are part of a voltage regulation circuit that may be configured to supply power to each component of the scanning device. The first voltage regulator may be a first voltage variable element in the voltage regulation circuit that receives electrical current from a power source that is electrically coupled to the voltage regulation circuit.

Moreover, in certain embodiments, the first voltage regulator may be a fixed voltage regulator.

The above description refers to a block diagram of the accompanying drawings. Alternative implementations of the example represented by the block diagram includes one or more additional or alternative elements, processes and/or devices. Additionally, or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A method for dynamically changing regulator voltage of a scanning device having an illumination system and an imager to reduce current consumption during a suspend mode, the method comprising:
    detecting, by a microcontroller of the scanning device, an indication to initiate the suspend mode of the scanning device; and
    adjusting, by the microcontroller executing a suspension routine, the voltage of a first voltage regulator of the scanning device from a first level to a second level, wherein the first voltage regulator provides power for use by (i) the microcontroller, (ii) the illumination system, and (iii) the imager, and the second level is less than the first level,
    wherein:
    a second voltage regulator is disposed between the first voltage regulator and the microcontroller; and
    the second voltage regulator provides power for use by the microcontroller at a third level that is less than the second level.

2. The method of claim 1, wherein detecting the indication to initiate the suspend mode of the scanning device further comprises:
    receiving, from a host device, the indication to initiate the suspend mode of the scanning device; or
    determining, by the microcontroller, to initiate the suspend mode of the scanning device based on a bus activity level between the scanning device and the host device.

3. The method of claim 2, wherein the microcontroller executing the suspension routine further comprises:
    adjusting, by the microcontroller, at least one of the illumination system or the imager from an active state to an inactive state; and
    adjusting, by the microcontroller, the voltage of the first voltage regulator from the first level to the second level.

4. The method of claim 3, wherein the microcontroller executing the suspension routine further comprises:
    receiving, from the host device, a new indication to deactivate the suspend mode of the scanning device;
    adjusting, by the microcontroller, the voltage of the first voltage regulator from the second level to the first level; and
    adjusting, by the microcontroller, the at least one of the illumination system or the imager from the inactive state to the active state.

5. The method of claim 3, wherein the microcontroller executing the suspension routine further comprises:
    determining, by the microcontroller, that bus activity has occurred between the scanning device and the host device;
    adjusting, by the microcontroller, the voltage of the first voltage regulator from the second level to the first level; and
    adjusting, by the microcontroller, the at least one of the illumination system or the imager from the inactive state to the active state.

6. The method of claim 1, wherein
    the first voltage regulator provides power to at least one other peripheral; and
    the at least one other peripheral includes one of: (i) a radio, (ii) a near-field communication (NFC) tag, (iii) a capacitive touch button controller, (iv) an inductive touch button controller, (v) a light emitting diode (LED), or (vi) a wireless power transfer transmitter.

7. The method of claim 1, wherein
    the first voltage regulator, the microcontroller, the illumination system, and the imager are part of a voltage regulation circuit that is configured to supply power to each component of the scanning device; and
    the first voltage regulator is a first voltage variable element in the voltage regulation circuit that receives electrical current from a power source that is electrically coupled to the voltage regulation circuit.

8. A computer system for dynamically changing regulator voltage of a scanning device having an illumination system and an imager to reduce current consumption during a suspend mode, the system comprising:
    one or more processors; and
    a non-transitory computer-readable memory coupled to the one or more processors, the memory storing instructions thereon that, when executed by the one or more processors, cause the one or more processors to:
        detect an indication to initiate the suspend mode of the scanning device, and
        adjust, by executing a suspension routine, the voltage of a first voltage regulator of the scanning device from a first level to a second level, wherein the first voltage regulator provides power for use by (i) the microcontroller, (ii) the illumination system, and (iii) the imager, and the second level is less than the first level,
    wherein:
    a second voltage regulator is disposed between the first voltage regulator and the microcontroller; and
    the second voltage regulator provides power for use by the microcontroller at a third level that is less than the second level.

9. The computer system of claim 8, wherein the instructions, when executed by the one or more processors, further cause the one or more processors to detect the indication to initiate the suspend mode of the scanning device by:

receiving, from a host device, the indication to initiate the suspend mode of the scanning device; or determining to initiate the suspend mode of the scanning device based on a bus activity level between the scanning device and the host device.

10. The computer system of claim 9, wherein the instructions, when executed by the one or more processors, further cause the one or more processors to execute the suspension routine by:

adjusting at least one of the illumination system or the imager from an active state to an inactive state; and adjusting the voltage of the first voltage regulator from the first level to the second level.

11. The computer system of claim 10, wherein the instructions, when executed by the one or more processors, further cause the one or more processors to execute the suspension routine by:

receiving, from the host device, a new indication to deactivate the suspend mode of the scanning device;

adjusting the voltage of the first voltage regulator from the second level to the first level; and adjusting the at least one of the illumination system or the imager from the inactive state to the active state.

12. The computer system of claim 10, wherein the instructions, when executed by the one or more processors, further cause the one or more processors to execute the suspension routine by:

determining that bus activity has occurred between the scanning device and the host device;

adjusting the voltage of the first voltage regulator from the second level to the first level; and adjusting the at least one of the illumination system or the imager from the inactive state to the active state.

13. The computer system of claim 8, wherein the first voltage regulator provides power to at least one other peripheral; and the at least one other peripheral includes one of: (i) a radio, (ii) a near-field communication (NFC) tag, (iii) a capacitive touch button controller, (iv) an inductive touch button controller, (v) a light emitting diode (LED), or (vi) a wireless power transfer transmitter.

14. The computer system of claim 8, wherein the first voltage regulator, the microcontroller, the illumination system, and the imager are part of a voltage regulation circuit that is configured to supply power to each component of the scanning device; and the first voltage regulator is a first voltage variable element in the voltage regulation circuit that receives electrical current from a power source that is electrically coupled to the voltage regulation circuit.

* * * * *